United States Patent [19]
Schultz

[11] 3,859,073
[45] Jan. 7, 1975

[54] METHOD OF PRODUCING GLASS BY FLAME HYDROLYSIS

[75] Inventor: Peter C. Schultz, Painted Post, N.Y.

[73] Assignee: Corning Glass Works, Corning, N.Y.

[22] Filed: Oct. 19, 1973

[21] Appl. No.: 407,918

[52] U.S. Cl. ............................... 65/60, 65/3, 65/4, 65/18, 65/DIG. 7, 117/46 FS, 117/123 A, 117/126 GF
[51] Int. Cl. ............................................. C03c 25/02
[58] Field of Search ............ 65/3, 4, 30, 60, DIG. 7, 65/18; 117/46 FS, 123 A, 126 GF

[56] References Cited
UNITED STATES PATENTS

| | | | |
|---|---|---|---|
| 3,535,890 | 10/1970 | Hansen et al. | 65/18 |
| 3,611,188 | 10/1971 | Snitzer | 65/DIG. 7 |
| 3,615,319 | 10/1971 | Shonebarger | 65/60 X |
| 3,737,292 | 6/1973 | Keck et al. | 65/4 X |

Primary Examiner—Robert L. Lindsay, Jr.
Attorney, Agent, or Firm—Clinton S. Janes, Jr.; Clarence R. Patty, Jr.

[57] ABSTRACT

A method of incorporating an additive or dopant oxide in a glass body produced by the flame hydrolysis technique. Particles of the primary glass former are produced by flame hydrolysis and deposited to form a porous body which is impregnated, in part at least, with a dopant which may be dissolved or suspended in a vehicle. The body is then thermally consolidated with the dopant dispersed therein.

14 Claims, 4 Drawing Figures

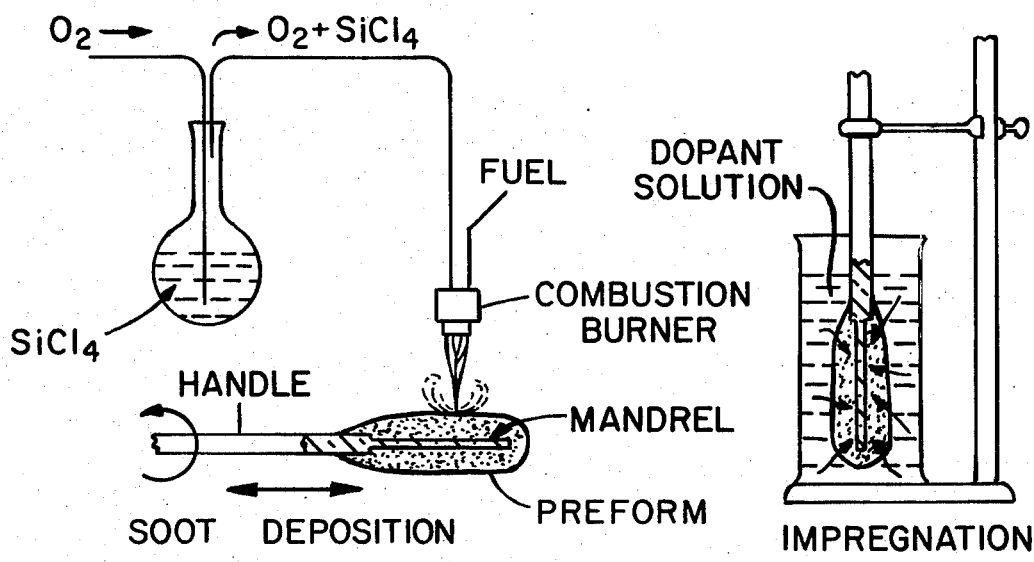
Fig. 1
Fig. 2
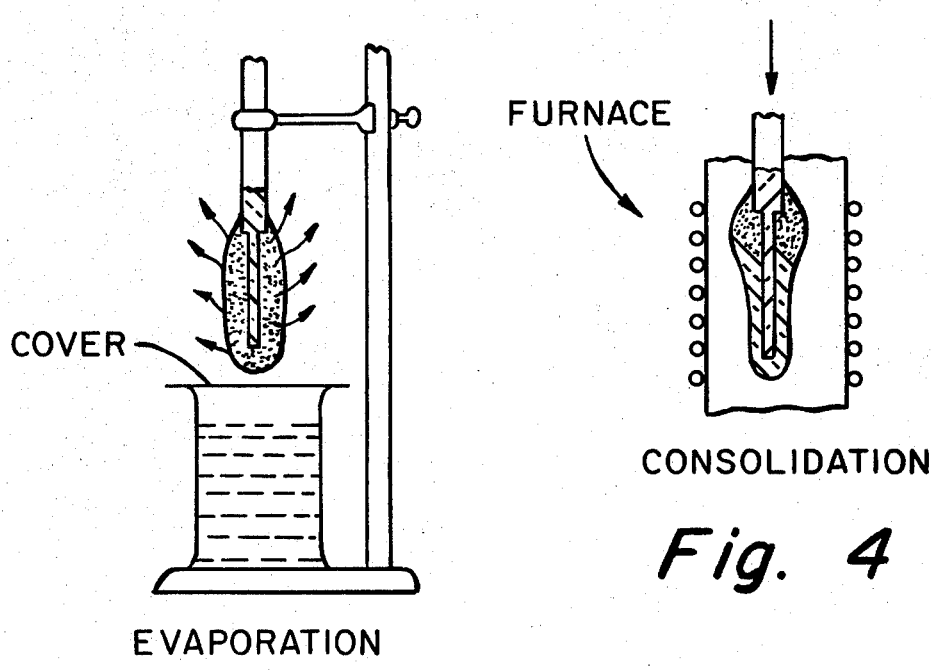
Fig. 3
Fig. 4

METHOD OF PRODUCING GLASS BY FLAME HYDROLYSIS

The invention relates to a method of producing a glass body, such as a fused silica type glass body, by flame hydrolysis. It is especially concerned with a unique method of incorporating a dopant or additive oxide into such a glass body. An alternative embodiment of the concept is disclosed and claimed in application S. N. 407,917, filed of even date herewith by W. H. Dumbaugh, Jr. and myself and also entitled "Method of Producing Glass by Flame Hydrolysis."

U. S. Pat. No. 2,272,342, granted Feb. 10, 1942 to J. F. Hyde, describes the flame hydrolysis technique of producing glass with reference to the production of pure fused silica, that is a glass composed entirely of silica ($SiO_2$). As described by Hyde, a stream of gas carrying a hydrolyzable compound of silicon in vapor form is introduced into a flame of combustible gas. The compound of silicon is hydrolyzed to form amorphous silica which may be collected in particulate form, or may be deposited on a mandrel or other support as a preform. The preform may be consolidated in position, or by a separate heat treatment.

Subsequent patents, including U.S. No. 2,326,059 granted Aug. 3, 1943 to M. E. Nordberg, and U.S. Pat. No. 2,239,551 granted Apr. 22, 1941 to R. H. Dalton et al., describe methods of producing glasses by flame hydrolysis wherein the glass is composed of an oxide mixture, in particular a fused silica type glass incorporating small amounts of one or more additional oxides such as titania or alumina. In general, these methods involve forming a mixture of volatile compounds in the desired proportions in a stream of gas fed to a combustion burner. The mixture of vapors is then hydrolyzed to deposit a glass or preform composed of a corresponding oxide mixture.

The mixed oxide glasses that can be produced by these earlier methods are limited by the ability to obtain materials that are relatively volatile and that may be hydrolyzed in accordance with the flame hydrolysis technique. Even when suitable volatile compounds are available, it may be difficult to control proportions in the final product. It may also be difficult to control introduction of an additive into a selected area or zone of an article.

The present invention provides a completely novel approach to the problem of introducing an oxide additive into a glass produced by flame hydrolysis, such as a fused silica type glass. Further, it provides a convenient means of introducing such an additive in a uniform manner and in controlled amount.

The invention is based on my discovery that oxide particles produced by the flame hydrolysis procedure can be deposited as a porous preform in which the particles have a strong cohesive bond to one another, but still provide a network of continuous open pores throughout the mass of the preform. It is further based on my discovery that this porous network can be uniformly impregnated with a desired dopant oxide, or compound convertible thereto, in liquid form, that is as a solution, suspension, or molten salt.

The invention is a method of incorporating an oxide additive into a glass body produced by flame hydrolysis which comprises passing one or more volatile compounds into a flame to produce the corresponding oxides in particulate form by hydrolysis of the volatile compounds, depositing the oxide particles on a support as an integral preform having a network of continuous open pores throughout its mass and being sufficiently cohesive to resist disintegration during liquid immersion, filling at least a portion of the pores in the preform with a material that contains the desired oxide additive, or a compound convertible, thereto, and that is substantially chemically inert with respect to the perform, and heat treating the preform to consolidate it into a non-porous glassy body composed of the oxide of hydrolysis containing the additive oxide dispersed throughout at least a portion of body.

The invention is hereafter described in greater particularity with respect to fused silica type glasses, a preferred embodiment of present practical interest. However, it will be understood that the invention is not limited to this type of glass, but may be employed in the production of glasses based on other glass forming oxides. For example, a germania ($GeO_2$) preform can be deposited on a mandrel by flame hydrolysis of $GeCl_4$, and such porous body may be impregnated and thermally consolidated as hereafter described. The invention may also be applied to porous preforms produced from such oxides as $B_2O_3$, $P_2O_5$, $SeO_2$ and $TeO_2$. Finally, multicomponent porous preforms may be deposited by the flame hydrolysis technique and then doped with additives by the technique of the present invention. Such multicomponent preforms include the $TiO_2-SiO_2$ and $Al_2O_3-ZrO_2-SiO_2$ glass systems described in the Nordberg and Dalton et al. patents mentioned earlier.

The present invention contemplates producing oxide particles, and depositing such particles to form a preform, in accordance with the conventional practice described in the Hyde, Nordberg and Dalton et al., patents mentioned earlier. Thus, as pointed out by Hyde, a suitable volatile silicon compound, such as one of the silicon halides, a silane, or halogen derivative thereof, may be selected. A particularly suitable material is $SiCl_4$ which may be readily volatilized by heating in a water bath and passing a suitable carrier gas therethrough. The silicon chloride vapors may be carried into the combustion burner flame by a stream of oxygen with the flame being maintained at a sufficiently low temperature so that small spherical silica particles of about 0.1 micron diameter are formed which bond tightly together in a preform body to leave a network of continuous open pores throughout the structure of the body.

It will be appreciated that, when a multicomponent preform is to be produced, a mixture of volatile compounds will be formed and introduced as a gaseous stream into a flame of combustible gas. Such mixture may be produced in the manner described in the Nordberg and Dalton et al., patents, or may be produced by subsequently developed methods such as described in Application Ser. No. 208, 168, entitled "Method of Producing Glass," filed Dec. 15, 1971 in the names of P. C. Schultz and F. W. Voorhees and now issued as U.S. Patent No. 3,801,294.

A critical factor in the present method is the manner in which the silica, or other glass forming oxide particles, are deposited from the combustion flame. The particles must be sufficiently coherent in the preform so that they will not separate and cause the preform to disintegrate in contact with liquid. At the same time, a network of continuous pores is required for effective impregnation. Thus, the particles cannot be so densely packed as to interfere with liquid entry into the preform during impregnation. In particular then, a substantial degree of incipient consolidation in the preform, that is collapse and closing of the pores to form a non-porous or closed-pore glassy mass, must be avoided.

There are several factors which may exert an influence on the preform development, and which must therefore be considered. Flame temperature is an important consideration of course. Also, the positioning of the mandrel or other preform carrier with respect to the flame. Finally, it is customary to rotate and translate the preform carrier during deposition, and these movements should be not only controlled but also maintained uniform in speed.

In summary, incipient consolidation may result from too hot a flame, from positioning of the mandrel and preform too close to the flame, or from a movement of the mandrel that is either too slow or uneven. Conversely, if the particles are too loosely bound, there is a tendency for the preform to disintegrate or crack when it is contacted with an impregnating solution. Such loose particle bonding may result from too cool a flame, too large a spacing between the flame and the preform, or too rapid movement of the preform during deposition.

It is apparent that these several parameters are so interrelated, and so dependent on materials involved, that fixed limits of operation cannot be established. However, effective conditions can be readily determined for any given operation. Tests, such as illustrated later, have shown that a total porosity in the preform, as measured by mercury porosimetry, should be on the order of 75% for optimum processing. In general bodies having porosities within the range of 60 to 90% can be useful. Average pore size or diameter tends to decrease with more intense heat treatment and ultimately becomes zero as the body consolidates. As a general rule, pore diameter should be within the range of 10.0 microns to 0.001 microns.

It may be noted that differential additive concentrations may be provided in different portions of a body by varying pore size or percentage. Thus, if an outer layer of the preform is deposited under more intense thermal conditions, it will have smaller pore size and will accept less impregnating solution. In turn, this outer layer will have a lower concentration of additive.

It will be apparent that the differential may be sharp or stepped, or it may be of a gradual or gradient nature. Also, it may be noted that impregnant may be removed from a surface layer for example to create a depleted condition and hence a differential concentration.

The process of the present invention is extremely versatile insofar as the addition of oxides to a fused oxide glass is concerned. Virtually any oxide that can be introduced into a glass structure can be added either as the oxide, or as a compound thermally convertible to the oxide as by oxidation or decomposition. Essentially the only condition imposed on the impregnating material, including the additive and any liquid vehicle used to dissolve or suspend the additive, is that it be substantially nondestructive, that is sufficiently chemically inert with respect to the preform oxide so that chemical action resulting in physical disintegration of the preform does not occur.

Usually it is most convenient to use a solution as the impregnating material. Volatile organic solvents are desirable for drying purposes, although toxicity and fire hazards must be considered. Aqueous solutions are generally desirable where cost is a dominant factor and fast drying is not requisite. Suspensions and colloidal solutions may also prove useful on occasion, but care must be exercised with suspensions to avoid either settling or uneven dispersion. It is also possible to use a molten salt as an impregnating material where the melting point is not too high. However, the invention will be generally described with reference to the more common practice of impregnation with a solution.

The present invention permits many metal oxides to be incorporated in fused silica which could not be incorporated by the earlier vapor mixture methods. For example, the halide compounds of the alkaline earth metals, the rare earth metals and certain of the transition elements have extremely low vapor pressures even at high temperatures. Such compounds were difficult to incorporate with a volatile silicon compound such as $SiCl_4$ prior to the flame hydrolysis step. However, these halide compounds are readily dissolved in the ordinary solvents such as water and the volatile organic liquids, and thus can readily be incorporated in a fused silica glass by the present process.

It will be appreciated that the impregnating solution may be a solution of the oxide, or oxides, desired in the glass, Alternatively, it may be a solution of a salt or other compound that will convert to the oxide during subsequent thermal consolidation of the porous preform.

The amount of a dopant oxide or salt that may be introduced into a porous preform in accordance with the present method is dependent on several different factors. A primary factor of course is concentration of the additive in the impregnating material. In general, the amount of additive incorporated in the glass will vary directly with concentration. The amount of additive is also dependent on the time that the preform is exposed to an impregnating bath, as, for example, the time of immersion of the preform in a container of solution. The degree of porosity of the preform, and the pore size as a factor therein, also control the rate of impregnation.

If a porous preform is to be completely impregnated, it is generally convenient to immerse the preform in a large container or bath of the solution for a suitable length of time. It is also possible to introduce additive into only a portion of the preform. In that case, the preform may be partially immersed, may be subjected to a spray of the solution, or may have the solution otherwise applied in selected areas as by brushing.

For example, it is possible to produce a surface layer of modified or doped glass on an article by limiting impregnation of the preform to only a surface layer and then rapidly drying. Where only a portion of a surface or a body is to be treated, this may be accomplished by partial immersion in some instances. Alternatively, it may be more desirable to temporarily mask or block a portion of the surface and then totally immerse the preform in impregnant.

It is also possible to incorporate more than one material as additive. Thus an impregnating solution may contain two different salts, for example a mixture of zinc and lead chlorides. Alternatively, a body may be impregnated with one solution, then dried and later impregnated with a second solution. Still another possibility is to introduce a limited amount of one impregnating material and follow this with a different material, thereby introducing different additives in different zones of a body.

If the solvent is sufficiently volatile, it may be removed by air drying, that is by simply setting the impregnated body in the open air and allowing the solvent to evaporate. The process may be hastened by creating an air flow over the body. Also, where quick drying is desired, or where a less volatile solvent is employed, the body may be heated at a low temperature in a tunnel oven or kiln. Care must be taken to avoid too rapid vapor generation and consequent cracking of the body.

Once the preform has been essentially completely dried, it may then be fired or thermally consolidated in the usual manner. The oxide or salt incorporated by impregnation remains dispersed throughout the pores and is incorporated into the fused silica glass as the porous body is consolidated by the usual heat treatment. The sintering or consolidating heat treatment may be an overall heating of the preform body as disclosed in the patents mentioned above. Alternatively, the heat treating process described in Application Ser. No. 239,742 entitled "Method and Apparatus for Producing High Quality Fused Silica," filed Mar. 30, 1972 in the names of J. S. Flamenbaum et al., and now issued as Patent No. 3,806,570, may be employed. In accordance with this procedure, the porous body is subjected to a progressive heat treatment as by being slowly passed into or through a thermal zone wherein consolidation takes place. This process has the advantage of minimizing gas inclusions in the body of the glass.

The invention is further described with reference to a specific embodiment as illustrated in the attached drawing wherein, FIG. 1 is a schematic illustration of the step of forming the porous preform, FIG. 2 is a schematic illustration of the impregnation step, FIG. 3 is a schematic illustration of the drying step, and FIG. 4 is a schematic illustration of the preferred sintering or thermal consolidation step.

As shown in FIG. 1, a stream of carrier gas, in this case oxygen, is introduced into and passes through the volatile silicon compound, in this case $SiCl_4$. The vapors of the volatile compound are entrained by the carrier gas and the mixture passes through a tube leading to a combustion burner wherein the vapors of the volatile compound are hydrolyzed and form silica $(SiO_2)$ particles in the flame of the burner.

As further illustrated in FIG. 1, a mandrel or support member, shown as a rod, is carried on the end of a handle which is adapted to be rotated and oscillated either manually or by suitable mechanical devices. Normally, the mandrel will be rotated at a controlled rate, and likewise will be oscillated or moved back and forth at a controlled rate so that the silica particles are deposited uniformly over the mandrel, and subsequently over the preform surface.

FIG. 2 illustrates a preferred form of the impregnation step. As shown, the preform is completely immersed in a solution of the desired additive or dopant material while supported in an upright position. The preform is supported in the solution for a length of time determined by the amount of material that it is desired to introduce into the capillaries of the preform. As explained earlier, this degree of impregnation is influenced by the concentration of the solution, the porosity of the preform and the time of impregnation. Having regard for these various factors, one can readily determine experimentally a particularly favorable set of conditions to provide a desired degree of material incorporated in the final product.

When the preform has been impregnated to a desired extent, it is preferably raised out of the impregnating solution and dried in open air as illustrated in FIG. 3. With a sufficiently volatile solvent, the drying will take place by simply supporting the preform in the air. To hasten the process, air, preferably warm air, may be blown across the surface of the preform. However, care must be taken to avoid too rapid or uneven drying.

Finally, the impregnated and dried porous preform is introduced into a heating chamber to thermally consolidate the porous body and incorporate the impregnated oxide therein. In the case of a fused silica body, the heating chamber will normally be operated at about 1,450°C. In accordance with earlier procedures, the preform may be immediately and completely introduced into the heating chamber whereby uniform consolidation takes place throughout the entire body. However, there is a tendency for gas inclusions, commonly known as bubbles or seed, to occur to a large degree when this procedure is followed. Accordingly, it has been found preferable to progressively introduce the preform into a heat zone, and thereby progressively consolidate the body into a non-porous body in the manner illustrated in FIG. 4. It will be understood that the preform may be removed from the mandrel or other support prior to thermal consolidation, although usually it is more convenient to handle the preform while thus supported.

The invention is further described with respect to a specific illustrative example wherein a fused silica body was prepared with cobalt oxide (CoO) incorporated therein as an additive:

A large container of liquid silicon tetrachloride $(SiCl_4)$ was maintained at a temperature of 25°C. while a stream of oxygen was bubbled therethrough at a rate of 3,700 cc./min. The mixture of oxygen and $SiCl_4$ vapors thus produced was carried through suitable tubing to a combustion burner in which a mixture of natural gas and oxygen was being burned, the natural gas and the oxygen being supplied at a rate of 0.4 cubic feet/minute each. The $SiCl_4$ vapors hydrolyzed in the flame to produce amorphous silica particles in the form of a soot which deposited on a fused quartz mandrel. The mandrel was a 9 inch length of tubing which had a 5 mm. outer diameter and was attached to a supporting rod having a ¾ inch diameter handle. This fused quartz mandrel was positioned approximately 7 inches from the burner and was simultaneously rotated and translated back and forth. The mandrel was rotated at a rate of 200 rpm and translated or oscillated at a rate of 16 inches/minute. It was found that these particular rates provided an even coating of silica soot on the mandrel while developing a desirable degree of porosity for subsequent impregnation.

A preform about 9 inches in length and 1 ½ inches in diameter was deposited in a period of approximately 3 hours operation. This porous preform was cooled and then slowly lowered into a large beaker containing 1,000 ml. of solution. The solution was composed of absolute methyl alcohol in which was dissolved 25.5 grams of hydrated cobalt chloride $(CoCl_2.6H_2O)$. This solution is equivalent to 1 percent by weight of cobalt oxide (CoO).

The preform was supported in the solution, in the manner illustrated in FIG. 2, for a period of 1 hour while the solution entered into and impregnated the porous, capillary structure of the preform. The preform was then slowly removed from the solution and suspended in a well-ventilated area at room temperature in the manner illustrated in FIG. 3. After a period of 24 hours drying, the methyl alcohol solvent was substantially all evaporated. The preform with cobalt chloride deposited throughout its porous structure was then mounted above an induction type furnace provided with a helium atmosphere and having a hot zone of approximately 1,450°C. It will be appreciated that any conventional type of induction or other electrically heated furnace might be employed. The preform, still supported on the mandrel and handle, was mounted in such a manner that it could be slowly introduced into the furnace and particularly into the hot zone thereof at a rate of one-fourth inch/min. In this manner, the preform was progressively consolidated over its length into a fused silica, vitreous mass having a diameter of approximately three-fourth inch.

The resulting fused silica body, in the shape of a rod, was clear and transparent, royal blue in color, and essentially free of bubbles or gas inclusions. When chemically analyzed, it was found to contain 0.13 percent by weight CoO.

The procedure of the preceding example was followed in each of several further examples, except that a different dopant or additive material was used. The following table illustrates several of these by setting forth (1) the additive material, (2) the vehicle (solvent or suspending agent), (3) the weight percent in solution or suspension converted to the oxide, (4) the oxide formed in the resulting glass, and (5) the weight % of oxide in the silica glass.

TABLE

| Additive | Solvent | Wt. % in solution (as oxide) | Oxide | Wt. % in glass |
|---|---|---|---|---|
| $NiCl_2 \cdot 6H_2O$ | methanol | 0.1 | NiO | 0.04 |
| $MnCl_2 \cdot 4H_2O$ | methanol | 0.1 | MnO | 0.012 |
| $LaCl_3 \cdot 7H_2O$ | methanol | 2.0 | $La_2O_3$ | 1.23 |
| $SmCl_3$ | methanol | 0.1 | $Sm_2O_3$ | 0.05 |
| $TbCl_3 \cdot 6H_2O$ | methanol | 0.1 | $Tb_2O_3$ | 0.08 |
| $NdCl_3 \cdot 6H_2O$ | methanol | 3.0 | $Nd_2O_3$ | 2.68 |
| $CoCl_2 \cdot 6H_2O$ | distilled water | 0.1 | CoO | 0.024 |
| $ZrO_2$ | (suspension in distilled water) | 2.0 | $ZrO_2$ | 0.89 |

Various properties were measured or observed on the doped glasses. Thus the NiO glass had a smokey grey appearance and the MnO glass, a pinkish cast; the $Sm_2O_3$ and the $Tb_2O_3$ glasses were essentially colorless, but the $Sm_2O_3$ glass fluoresced orange-pink, and the $Tb_2O_3$ white, under influence of 2,537 wavelength radiation; the cobalt glass was blue as in the first example. The $La_2O_3$ glass had a refractive index of 1.461; the $ZrO_2$ glass an index of 1.459; the $Nd_2O_3$ glass an index of 1.462 and a yellow-green fluorescence under influence of 2,537A wavelength radiation.

In a further example, a silica preform was produced as in the first example, and, after impregnation, was consolidated as in that example. However, the preform was impregnated by immersion for 3 minutes in a molten bath of zinc chloride ($ZnCl_2$) at 265°C. in a 96 percent silica container. After cooling and consolidation, the glass was found to have an index of refraction of 1.462 and a ZnO content of 2.46 percent. It may be noted that the index of refraction of pure silica is 1.458.

In order to illustrate the porosity requirements for successful practice of the invention, three silica preforms were prepared by collection of silica soot from a combustion burner as in Example I. However, burner settings and position were varied to provide different conditions of deposit. These are shown in the following chart as natural gas flow in cubic feet/minute (cfm), oxygen flow in cfm, and distance in inches of the burner nozzle from the collection point on the mandrel.

TABLE II

| gas (cfm) | oxygen (cfm) | distance (inches) |
|---|---|---|
| 0.4 | 0.4 | 7 |
| 0.5 | 0.5 | 4.5 |
| 0.3 | 0.3 | 8 |

The initial setting was one considered optimum for purposes of the invention; the second setting produced a hot flame at short range; while the last setting produced a cooler flame at longer range. The preform prepared by the second setting was a porous body that could be impregnated with solution. However, there were visible hard nodules forming on the surface indicating incipient consolidation, an undesirable condition for the impregnation process. The preform prepared by the third process had a fluffy appearance and a tendency to fall apart.

When tested with a mercury impregnation porosimeter, the first preform had a porosity of 75 percent; the second a porosity of 63.6 percent; and the third a porosity on the order of 100 percent indicating disintegration was occurring. From such tests, as well as other experience, it is considered desirable to employ preforms with a porosity between 60 percent and 90 percent, preferably between 70 and 80 percent.

I claim.

1. A method of incorporating an oxide additive into a glass body produced by flame hydrolysis which comprises passing one or more hydrolyzable compounds of $SiO_2$, $GeO_2$, $B_2O_3$, $P_2O_5$, $SeO_2$, and $TeO_2$ in vapor form into a flame to produce the corresponding oxides in particulate form by hydrolysis of said compounds, depositing the oxide particles on a support as an integral preform having a network of continuous open pores throughout its mass and being sufficiently cohesive to resist disintegration during liquid immersion, said porosity being between about 60–90 percent and said pores having a diameter ranging between about 0.001–10 microns, filling at least a portion of the pores in the preform with a dopant material in liquid form that contains the desired oxide additive, or a compound convertible thereto, said liquid form being a solution, a colloidal solution, a suspension, or a compound in the molten state and that is substantially chemically inert with respect to the preform, depositing said material as a solid in said pores, and heat treating the preform to consolidate it into a non-porous glassy body composed of the oxide of hydrolysis containing the additive oxide dispersed throughout at least a portion of the body.

2. A method in accordance with claim 1 wherein the compound passed into the flame is a volatile compound of silicon and a preform composed of silica is formed.

3. A method in accordance with claim 2 wherein the silica preform is impregnated with an alcohol solution of a metal salt.

4. A method in accordance with claim 3 wherein the metal salt is a chloride.

5. A method in accordance with claim 1 wherein said porous preform also contains $TiO_2$, $Al_2O_3$, $ZrO_2$, or mixtures thereof.

6. A method in accordance with claim 1 wherein the dopant is suspended in a vehicle and the vehicle is evaporated before heat treatment.

7. A method in accordance with claim 1 wherein the dopant is dissolved in a volatile organic liquid.

8. A method in accordance with claim 1 wherein the dopant is dissolved in water.

9. A method in accordance with claim 1 wherein the filling material contains a plurality of different additives.

10. A method in accordance with claim 1 wherein the additive oxide is introduced by immersing the preform in a liquid bath containing the additive oxide or a material convertible thereto.

11. A method in accordance with claim 1 wherein the oxide particles are so deposited as to produce a differential in pore size in different portions of the preform.

12. A method in accordance with claim 11 wherein the differential is a continuous gradient.

13. A method in accordance with claim 1 wherein only a portion of the preform is filled with additive.

14. A method in accordance with claim 13 wherein the portion filled is a surface layer.

* * * * *